(No Model.) 2 Sheets—Sheet 1.

W. R. WHITELAW.
WATER HEATER.

No. 419,389. Patented Jan. 14, 1890.

Witnesses.
F. B. Fetherstonhaugh.
W. J. McMillan.

Inventor:
Wm. R. Whitelaw
Donald C. Ridout & Co.
Attys.

(No Model.) 2 Sheets—Sheet 2.

W. R. WHITELAW.
WATER HEATER.

No. 419,389. Patented Jan. 14, 1890.

Witnesses.
J. B. Featherstonhaugh.
W. G. McMillan.

Inventor:
Wm. R. Whitelaw
by
Donald C. Ridout & Co
Attys

UNITED STATES PATENT OFFICE.

WILLIAM R. WHITELAW, OF COBOURG, ONTARIO, CANADA.

WATER-HEATER.

SPECIFICATION forming part of Letters Patent No. 419,389, dated January 14, 1890.

Application filed May 1, 1889. Serial No. 309,273. (No model.)

*To all whom it may concern:*

Be it known that I, WILLIAM ROBINSON WHITELAW, merchant, of the town of Cobourg, in the county of Northumberland, in the Province of Ontario, Canada, have invented a certain new and Improved Water-Heater, of which the following is a specification.

The object of the invention is to design an easily-constructed water-heater having a large heating-surface, and in which all the smoke-flues may be readily got at and cleaned; and it consists, essentially, of a furnace in which the combustion-chamber is bounded by three hollow sides extending from the bottom of the ash-pit to a point where they connect with a horizontal chamber suspended above the combustion-chamber and having drop-pipes projecting downwardly from it into the combustion-chamber. The hollow sides are bolted together; but their interiors are not connected, except through the horizontal chamber and through a narrow chamber located below the fuel-door. The furnace thus constructed is surrounded by a jacket designed to form a smoke-flue, through which the heated gases may be directed around the furnace down toward a smoke-flue connected near the base of the jacket and leading to the main escape-flue, the whole being constructed in detail substantially as hereinafter more particularly explained.

Figure 1:
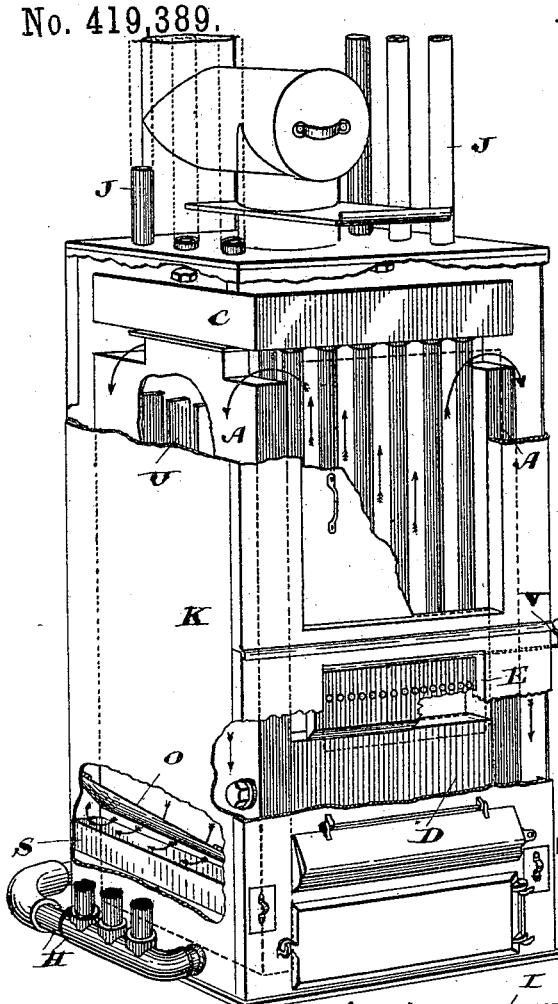
Figure 2:
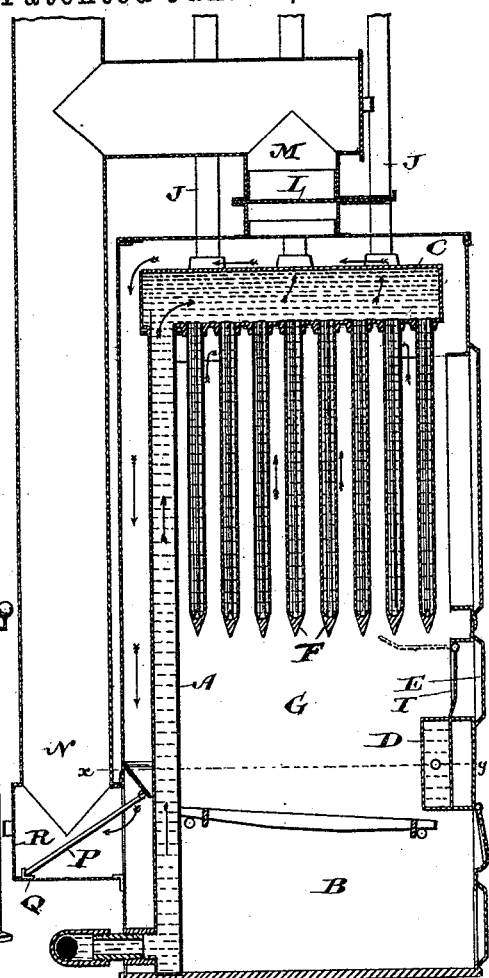
Figure 3:
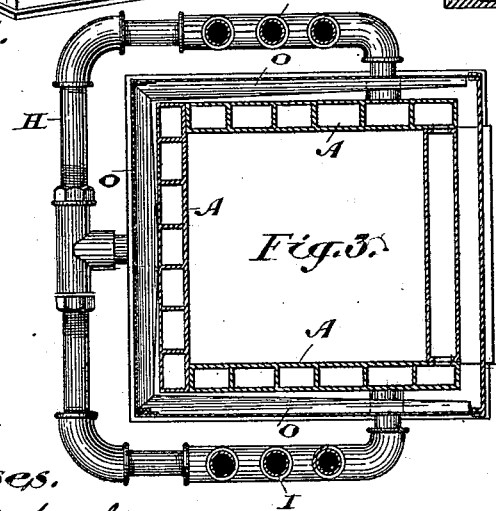
Figure 4:
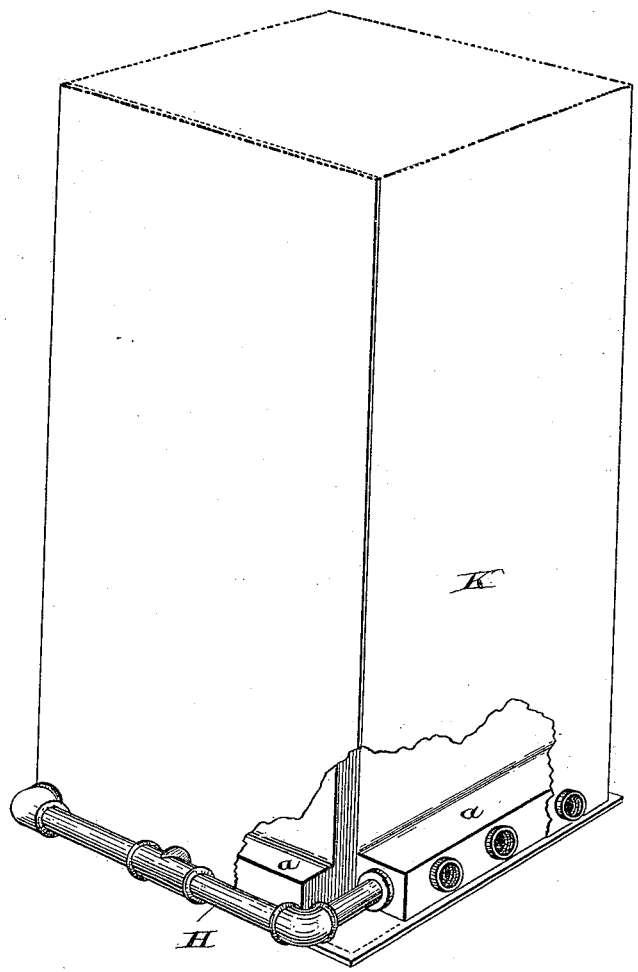

Figure 1 is a perspective view partially broken away to expose the interior construction. Fig. 2 is a sectional side elevation. Fig. 3 is a sectional plan through $x\ y$ of Fig. 2. Fig. 4 is a perspective back view showing an alternative form of side and back water-sections.

The hollow sides A extend from the bottom of the ash-pit B to the horizontal chamber C, with which they connect, as indicated in Fig. 1. The sides A are independent of each other, except that their interiors connect with the horizontal chamber C and a narrow horizontal chamber D, located immediately below the feed-door E. Drop-pipes F extend from the chamber C down into the combustion-chamber G. I do not claim anything peculiar in these drop-pipes F, as they are old; but I show them, as they form an essential feature in my design of furnace. As the sides A are practically independent of each other, I provide a feed-pipe H, with branches to connect with each of the three sides A. Into this feed-pipe the return-pipes I enter, as indicated in Fig. 1. The distributing-pipes J communicate with and extend from the horizontal chamber C. The water which enters from the return-pipes I flows into the hollow sides A at a point near the ash-pit B and ascends to the horizontal chamber C and also into the horizontal chamber D, as well as into the drop-pipes F, and as there is, owing to the construction described, a large heating-surface the full benefit from the fire in the combustion-chamber G is secured for heating the water as it passes through the boiler up into the distributing-pipes F.

It will be observed that a jacket K surrounds the furnace, leaving an air-space between it and the outer surface of the hollow sides A.

When the fire is first lighted, or when it is desired to force the fire, the damper L is opened, leaving a clear draft into the direct flue M; but when it is desired to secure the full benefit of the heated gases which pass away with the smoke I close the damper L, causing the smoke and heated gases to pass down the air-space formed between the jacket K and the sides A, from which it escapes into the flue N, leading to the main smoke-flue. In this way I surround the whole boiler with a jacket of heated gases, thus securing the full benefit of combustion for heating the water contained within the boiler.

With the view of preventing the smoke and heated gases passing by the shortest way possible to the flue N, I place in each air-space near its bottom a horizontal partition O and cut each partition O obliquely, so that but very little space is left between its edge and the sides A near the flue N, while the size of the said space increases as the distance from the said flue increases. In this way the smoke and heated gases are directed toward the sides A remote from the flue N, and thus insure that all parts of the sides A shall derive benefit from the said heated gases.

With the view of removing the soot which may collect on the partitions O, I prefer to hinge each partition and arrange it to be held in any suitable manner—for instance, as shown in Fig. 2, in which I support it by one or more rods P, which, when set to support the said partition, as shown in this figure, its end butts against a step Q. By removing the cover R the rod or rods P may be lifted off the step, and thus permit the partition O to drop down. Under each partition I place a dust-pan S to collect the soot and dust. These dust-pans may be removed and emptied as may become necessary.

With the view of protecting the drop-pipes F, I hinge a perforated door T in such a manner that no fuel can be thrown into the combustion-chamber G until the door T is turned on its hinge or pivot, so as to assume the position in which it is shown in dotted lines in Fig. 1, and thus form a protection for the drop-pipes F, which might otherwise be bent or injured by the fuel being thrown in through the door.

A suitable handle V, extending to the outside of the furnace, is provided for the purpose of operating the door T. The perforations in the door T are made so as not to interfere with the admission of air into the combustion-chamber when the damper in the feed-door E is opened for that purpose.

With the view of strengthening the hollow sides A, I cast a series of vertical partitions U in each side A.

In Fig. 4 it will be noticed that the bottoms of the hollow sides A are extended to the jacket, thus dispensing with the side pipes shown in Figs. 1 and 3. The extension or step $a$ thus formed supports the dust or soot pan S. The bottom of the back section A is also extended. These steps allow more room for the return-water to circulate on re-entering the boiler.

What I claim as my invention is—

1. The combination, with the hollow sides A, of the horizontal chamber C, having drop-pipes F connected to it and jointed to the said hollow sides A, so that the interior of each side shall communicate with the interior of the horizontal chamber C, and the feed-pipe having branches connecting with the hollow sides, substantially as and for the purpose specified.

2. The combination, with the hollow sides A and with the horizontal chamber D, connecting the interior of two of the said sides, of a horizontal chamber C, having drop-pipes F connected to it and jointed to the said hollow sides A, so that the interior of each side shall communicate with the interior of the horizontal chamber C, substantially as and for the purpose specified.

3. The hollow sides A and the horizontal chamber C, having drop-pipes F connected to it and jointed to the said hollow sides A, so that the interior of each side shall communicate with the interior of the horizontal chamber C, in combination with the pipe H, connected by suitable branches to three of the said sides near their base, and with the pipes J, connected to and extending from the horizontal chamber C, substantially as and for the purpose specified.

4. The hollow sides A and the horizontal chamber C, having drop-pipes F connected to it and jointed to the said hollow sides A, so that the interior of each side shall communicate with the interior of the horizontal chamber C, in combination with the jacket K, damper L, and flues M and N, substantially as and for the purpose specified.

5. The hollow sides A and the horizontal chamber C, having drop-pipes F connected to it and jointed to the said hollow sides A, so that the interior of each side shall communicate with the interior of the horizontal chamber C, in combination with the jacket K, damper L, and flues M and N, and hinged partition O, substantially as and for the purpose specified.

6. The hollow sides A and the horizontal chamber C, having drop-pipes F connected to it and jointed to the said hollow sides A, so that the interior of each side shall communicate with the interior of the horizontal chamber C, in combination with the perforated door T, hinged on the inside of the feed-doorway, substantially as and for the purpose specified.

Cobourg, April 9, 1889.

WILLIAM R. WHITELAW.

In presence of—
  W. R. RIDDELL,
    *Barrister, Cobourg, Ont.*
  WM. H. NESBITT,
    *Student at law, Cobourg, Ont.*